US 011585248B2

(12) United States Patent
Kawamura

(10) Patent No.: US 11,585,248 B2
(45) Date of Patent: Feb. 21, 2023

(54) HYDRAULIC OIL CONTROL VALVE AND VALVE TIMING ADJUSTMENT DEVICE

(71) Applicant: DENSO CORPORATION, Kariya (JP)

(72) Inventor: Futoshi Kawamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/483,371

(22) Filed: Sep. 23, 2021

(65) Prior Publication Data

US 2022/0010694 A1 Jan. 13, 2022

Related U.S. Application Data

(63) Continuation of application No. PCT/JP2020/012845, filed on Mar. 24, 2020.

(30) Foreign Application Priority Data

Mar. 25, 2019 (JP) .............................. JP2019-055898

(51) Int. Cl.
*F01L 1/344* (2006.01)
*F16K 11/07* (2006.01)
*F16K 27/04* (2006.01)

(52) U.S. Cl.
CPC ............ *F01L 1/3442* (2013.01); *F16K 11/07* (2013.01); *F16K 27/041* (2013.01); *F01L 2001/34426* (2013.01)

(58) Field of Classification Search
CPC .................. F01L 1/3442; F01L 1/022; F01L 2001/34426; F01L 2001/34456;

(Continued)

(56) References Cited

U.S. PATENT DOCUMENTS

2015/0300212 A1   10/2015   Bayrakdar
2017/0022854 A1   1/2017    Takada
(Continued)

FOREIGN PATENT DOCUMENTS

GB       2424258 A   *  9/2006   .............. F01L 1/022
JP    2016-223568        12/2016
(Continued)

OTHER PUBLICATIONS

U.S. Appl. No. 17/483,239, to Kawamura, entitled "Hydraulic Oil Control Valve and Valve Timing Adjustment Device", filed Sep. 23, 2021 (41 pages).

(Continued)

*Primary Examiner* — Devon C Kramer
*Assistant Examiner* — Wesley G Harris
(74) *Attorney, Agent, or Firm* — Nixon & Vanderhye P.C.

(57) ABSTRACT

A hydraulic oil control valve is coaxially disposed with a rotational axis of a valve timing adjustment device. The hydraulic oil control valve includes a sleeve and a spool that is slidably moved in an axial direction within the sleeve in a radial direction. The sleeve includes an inner sleeve disposed radially outside of the spool and an outer sleeve defining an axial hole extending in the axial direction. The inner sleeve is inserted into the axial hole. The outer sleeve is fixed to an end portion of one shaft when an axial force is applied to the outer sleeve in the axial direction. An inner sleeve end portion of the inner sleeve in the axial direction away from the actuator protrudes from the outer sleeve away from the actuator in the axial direction.

7 Claims, 6 Drawing Sheets

(58) Field of Classification Search
CPC .. F01L 2301/00; F16K 11/07; F16K 11/0716; F16K 27/041; F16K 31/0613
See application file for complete search history.

(56) References Cited

U.S. PATENT DOCUMENTS

| | | | |
|---|---|---|---|
| 2017/0130621 A1* | 5/2017 | Suganuma | F01L 1/053 |
| 2019/0323388 A1 | 10/2019 | Mitsutani | |
| 2019/0323389 A1 | 10/2019 | Mitsutani et al. | |
| 2019/0323392 A1 | 10/2019 | Mitsutani | |
| 2019/0368387 A1 | 12/2019 | Mitsutani | |
| 2020/0248822 A1* | 8/2020 | Stanhope | F16K 11/0716 |

FOREIGN PATENT DOCUMENTS

| | | |
|---|---|---|
| JP | 2018-059415 | 4/2018 |
| JP | 2020-159201 | 10/2020 |
| JP | 2020-159203 | 10/2020 |
| JP | 2020-159204 | 10/2020 |
| WO | WO-2006061071 A1 * | 6/2006 ............. F01L 1/344 |
| WO | 2020/196403 | 10/2020 |
| WO | 2020/196404 | 10/2020 |
| WO | 2020/196454 | 10/2020 |
| WO | 2020/196457 | 10/2020 |

OTHER PUBLICATIONS

U.S. Appl. No. 17/483,437, to Kawamura, entitled "Hydraulic Oil Control Valve and Valve Timing Adjustment Device", filed Sep. 23, 2021 (47 Pages).
U.S. Appl. No. 17/483,499, to Kawamura, entitled "Hydraulic Oil Control Valve and Valve Timing Adjustment Device", filed Sep. 23, 2021 (42 pages).
U.S. Appl. No. 17/483,540, to Kawamura, entitled "Hydraulic Oil Control Valve and Valve Timing Adjustment Device", filed Sep. 23, 2021 (53 pages).
U.S. Appl. No. 17/483,605, to Kawamura, entitled "Valve Timing Adjustment Device", filed Sep. 23, 2021 (34 pages).

* cited by examiner

HYDRAULIC OIL CONTROL VALVE AND VALVE TIMING ADJUSTMENT DEVICE

CROSS REFERENCE TO RELATED APPLICATION

The present application is a continuation application of International Patent Application No. PCT/JP2020/012845 filed on Mar. 24, 2020, which designated the U.S. and claims the benefit of priority from Japanese Patent Application No. 2019-055898 filed on Mar. 25, 2019. The entire disclosures of all of the above applications are incorporated herein by reference.

TECHNICAL FIELD

The present disclosure relates to a hydraulic oil control valve used for a valve timing adjustment device.

BACKGROUND

A hydraulic valve timing adjustment device that is capable of adjusting a valve timing of an intake valve or an exhaust valve of an internal combustion engine has been known. In the hydraulic valve timing adjustment device, a supply of a hydraulic oil into hydraulic chambers defined by a vane rotor in a housing and a discharge of the hydraulic oil from the hydraulic chambers may be achieved by a hydraulic oil control valve disposed in a center portion of the vane rotor. The hydraulic oil control valve has a double-structure tubular sleeve including an outer sleeve and an inner sleeve. The outer sleeve is fastened to an end portion of a camshaft and a spool is moved inside the inner sleeve, so that an oil channel is switched.

SUMMARY

A hydraulic oil control valve is used for a valve timing adjustment device. The valve timing adjustment device is configured to adjust valve timing of a valve and fixed to an end portion of one of a drive shaft and a driven shaft. The driven shaft is configured to selectively open and close the valve with a driving force transmitted from the drive shaft. The hydraulic oil control valve is coaxially disposed with a rotational axis of the valve timing adjustment device and configured to control a flow of a hydraulic oil supplied from a hydraulic oil supply source. The hydraulic oil control valve includes a tubular sleeve and a spool. The spool has an end portion in contact with an actuator and is slidably moved by the actuator in an axial direction within the sleeve in a radial direction. The sleeve includes an inner sleeve and an outer sleeve. The inner sleeve is disposed outside of the spool in the radial direction. The outer sleeve defines therein an axial hole extending in the axial direction and the inner sleeve is inserted into the axial hole. The outer sleeve is fixed to the end portion of the one of the drive shaft and the driven shaft when an axial force is applied to the outer sleeve in the axial direction. The inner sleeve has an inner sleeve end portion that is an end portion of the inner sleeve in the axial direction away from the actuator. The inner sleeve end portion extends beyond the outer sleeve in a direction away from the actuator.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
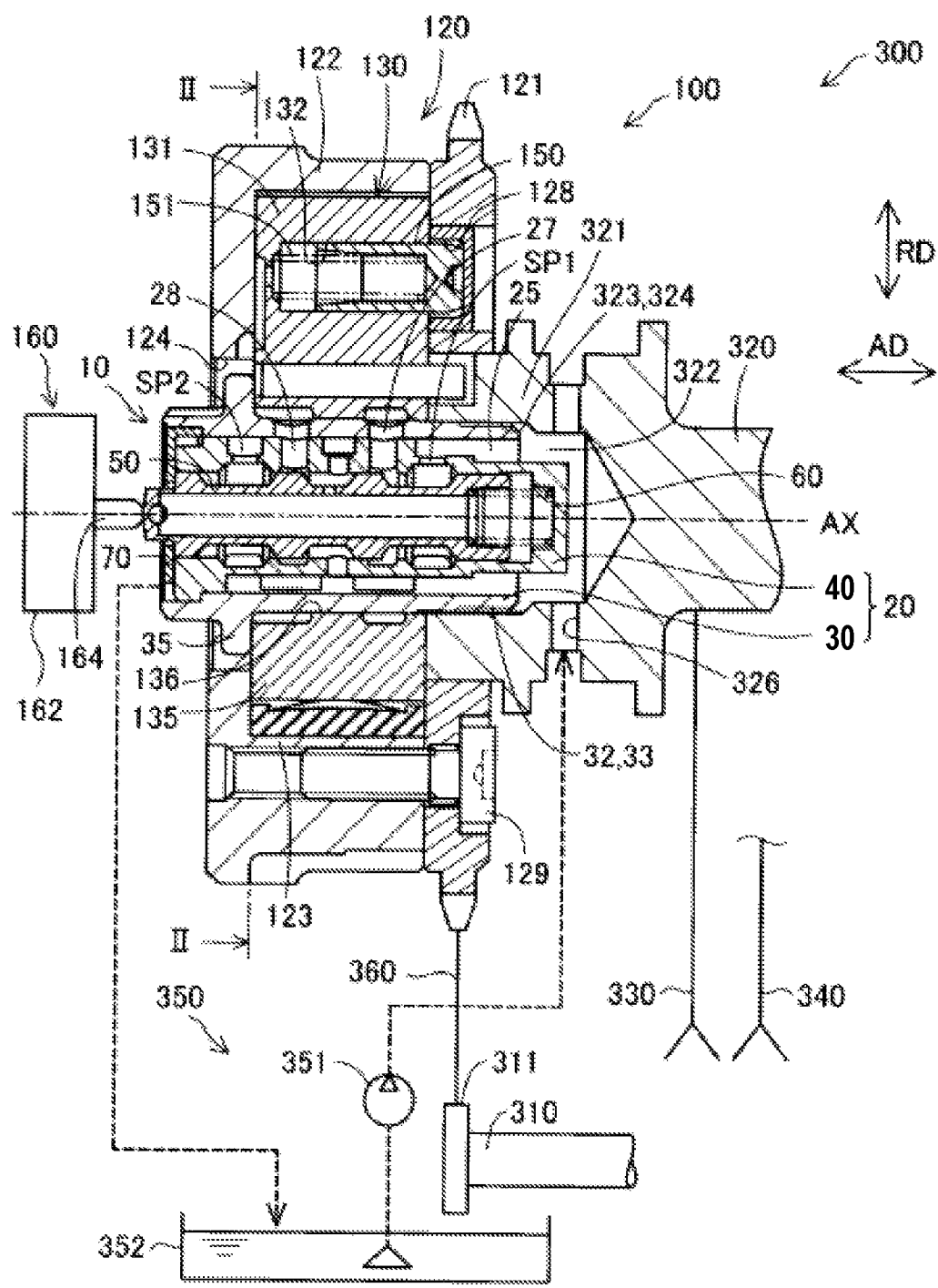
FIG. 1 is a cross-sectional view showing a schematic configuration of a valve timing adjustment device including a hydraulic oil control valve.

To begin with, examples of relevant techniques will be described.

A hydraulic valve timing adjustment device that is capable of adjusting a valve timing of an intake valve or an exhaust valve of an internal combustion engine has been known. In the hydraulic valve timing adjustment device, a supply of a hydraulic oil into hydraulic chambers defined by a vane rotor in a housing and a discharge of the hydraulic oil from the hydraulic chambers may be achieved by a hydraulic oil control valve disposed in a center portion of the vane rotor. The hydraulic oil control valve has a double-structure tubular sleeve including an outer sleeve and an inner sleeve. The outer sleeve is fastened to an end portion of a camshaft and a spool is moved inside the inner sleeve, so that an oil channel is switched. In such a hydraulic oil control valve, portions in the circumferential direction of an inner space between the outer sleeve and the inner sleeve in the radial direction serve respectively as a hydraulic oil supply passage and a drain passage.

In the hydraulic oil control valve, a check valve is disposed in an end portion of the inner sleeve closer to the camshaft, so that a dimension of the inner sleeve in the axial direction is increased. Further, the inner space between the outer sleeve and the inner sleeve in the radial direction is sealed at least a portion in the circumferential direction to separate the hydraulic oil supply passage from the drain passage. Thus, in order to secure a predetermined dimension as a dimension of the sealing portion in the axial direction, a dimension of the outer sleeve may be further increased compared to the dimension of the inner sleeve. When the dimension of the outer sleeve in the axial direction is increased, it is necessary to form a deep hole in the end portion of the camshaft to fix the outer sleeve to the camshaft. Therefore, a technique for suppressing an increase in the dimension of the outer sleeve in the axial direction is needed.

The present disclosure can be realized as the following embodiments.

According to one embodiment of the present disclosure, a hydraulic oil control valve is provided. The hydraulic oil control valve is used for a valve timing adjustment device. The valve timing adjustment device is configured to adjust valve timing of a valve and fixed to an end portion of one of a drive shaft and a driven shaft. The driven shaft is configured to selectively open and close the valve with a driving force transmitted from the drive shaft. The hydraulic oil control valve is coaxially disposed with a rotational axis of the valve timing adjustment device and configured to control a flow of a hydraulic oil supplied from a hydraulic oil supply source. The hydraulic oil control valve includes a tubular sleeve and a spool. The spool has an end portion in contact with an actuator and is slidably moved by the actuator in an axial direction within the sleeve in a radial direction. The sleeve includes an inner sleeve and an outer sleeve. The inner sleeve is disposed outside of the spool in the radial direction. The outer sleeve defines therein an axial hole extending in the axial direction and the inner sleeve is inserted into the axial hole. The outer sleeve is fixed to the end portion of the one of the drive shaft and the driven shaft when an axial force is applied to the outer sleeve in the axial direction. The inner sleeve has an inner sleeve end portion that is an end portion of the inner sleeve in the axial direction away from the actuator. The inner sleeve end portion extends beyond the outer sleeve in a direction away from the actuator.

According to the hydraulic oil control valve, the inner sleeve end portion that is an end portion of the inner sleeve in the axial direction away from the actuator extends beyond the outer sleeve away from the actuator. Thus, it is possible to suppress an increase in a dimension of the outer sleeve in the axial direction compared to a configuration in which the inner sleeve end portion overlaps with the outer sleeve in the radial direction.

The present disclosure can be realized as the following embodiments. For example, it can be realized in a method for manufacturing a hydraulic oil control valve, a valve timing adjustment device provided with a hydraulic oil control valve, a method for manufacturing the valve timing adjustment device, and the like.

A. Embodiment

A-1. Device Configuration

A valve timing adjustment device 100 shown in FIG. 1 is used for an internal combustion engine 300 of a vehicle (not shown) and configured to adjust a valve timing of a valve that is opened or closed by a camshaft 320 to which a driving force is transmitted from a crankshaft 310. The valve timing adjustment device 100 is provided in a power transmission path from the crankshaft 310 to the camshaft 320. More specifically, the valve timing adjustment device 100 is fixed to an end portion 321 of the camshaft 320 in a direction along a rotational axis AX of the camshaft 320 (hereinafter, referred to as "an axial direction AD"). The valve timing adjustment device 100 has a rotational axis AX that is coaxial with the rotational axis AX of the camshaft 320. The valve timing adjustment device 100 of the present embodiment is configured to adjust valve timing of an intake valve 330 among the intake valve 330 and an exhaust valve 340.

The end portion 321 of the camshaft 320 defines a shaft hole portion 322 and a supply inlet 326. The shaft hole portion 322 is formed in the axial direction AD. The shaft hole portion 322 has a shaft fixing portion 323 on an inner circumferential surface of the shaft hole portion 322 to fix a hydraulic oil control valve 10 which will be described later. The shaft fixing portion 323 has a female thread portion 324. The female thread portion 324 configured to be screwed with a male thread portion 33 formed in a fixing portion 32 of the hydraulic oil control valve 10. The supply inlet 326 is formed in a direction perpendicular to the axial direction AD (hereinafter, also referred to as "a radial direction RD"), and fluidly connects between the outer circumferential surface of the camshaft 320 and the shaft hole portion 322. The extending direction of the supply inlet 326 is not limited to the radial direction RD and may be an arbitrary direction intersecting the axial direction AD. The supply inlet 326 is used to supply hydraulic oil from a hydraulic oil supply source 350 to the hydraulic oil control valve 10. The hydraulic oil supply source 350 includes an oil pump 351 and an oil pan 352. The oil pump 351 pumps the hydraulic oil stored in the oil pan 352.

Figure 2:
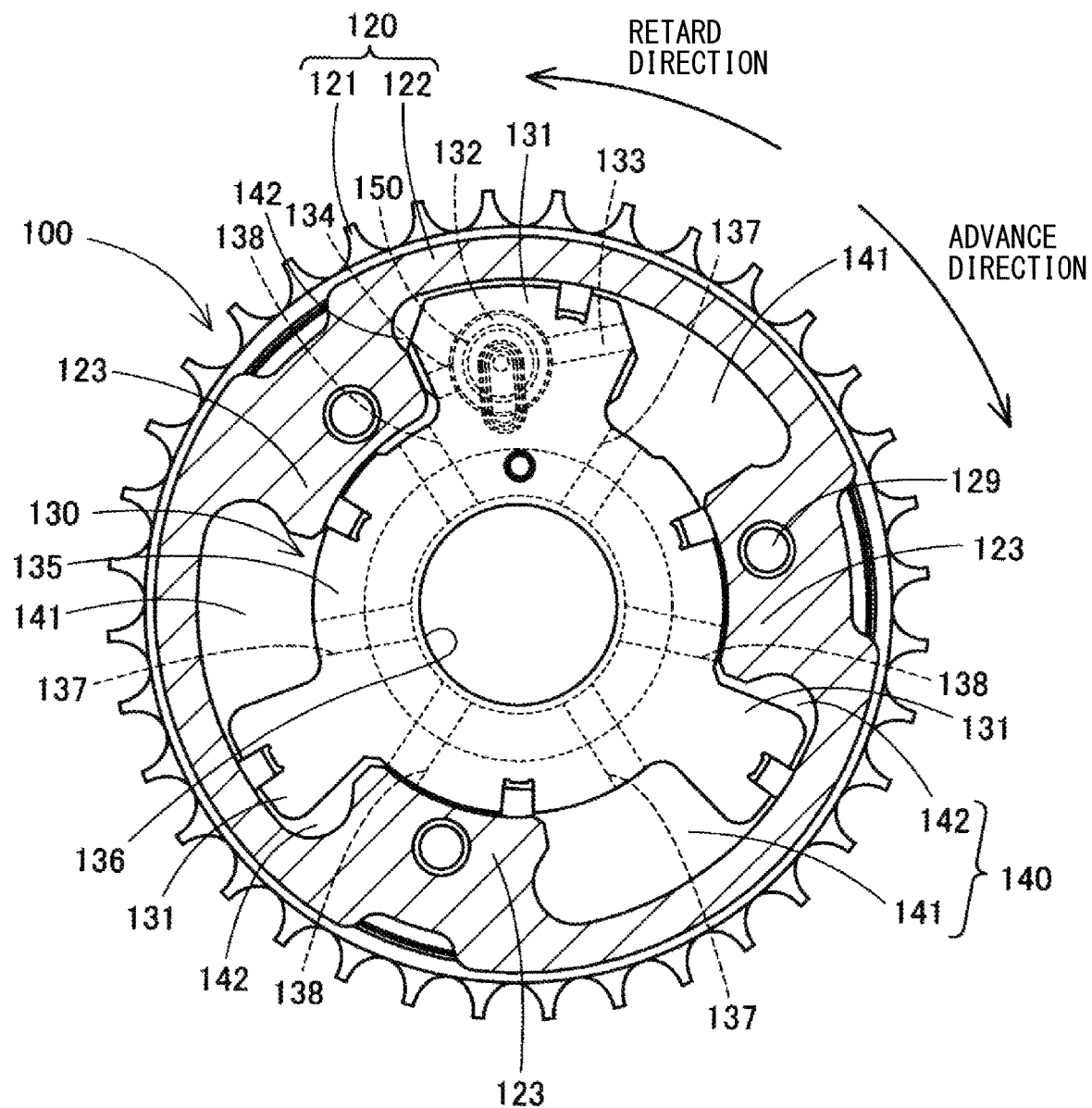
FIG. 2 is a cross-sectional view taken along a line II-II in FIG. 1.

As shown in FIGS. 1 and 2, the valve timing adjustment device 100 includes a housing 120, a vane rotor 130, and the hydraulic oil control valve 10. In FIG. 2, illustration of the hydraulic oil control valve 10 is omitted.

As shown in FIG. 1, the housing 120 includes a sprocket 121 and a case 122. The sprocket 121 is fit to the end portion 321 of the camshaft 320 and is rotatably supported. The sprocket 121 defines a fitting recessed portion 128 at a position corresponding to a lock pin 150 which will be described later. An annular timing chain 360 is disposed around the sprocket 121 and a sprocket 311 of the crankshaft 310. The sprocket 121 is fixed to the case 122 with multiple bolts 129. Thus, the housing 120 rotates together with the crankshaft 310. The case 122 has a bottomed tubular shape and an opening end of the case 122 is closed by the sprocket 121. As shown in FIG. 2, the case 122 includes multiple partition walls 123 that protrude inward in the radial direction RD and are arranged in a circumferential direction. Spaces defined between adjacent ones of the partition walls 123 in the circumferential direction serve as hydraulic chambers 140. As shown in FIG. 1, the case 122 defines an opening 124 at a center of a bottom portion of the case 122.

The vane rotor 130 is housed inside the housing 120 and configured to rotate in a retard direction or in an advance direction relative to the housing 120 in accordance with a hydraulic pressure of the hydraulic oil supplied from the hydraulic oil control valve 10 which will be described later. Therefore, the vane rotor 130 serves as a phase shifting portion configured to shift a phase of a driven shaft relative to a drive shaft. The vane rotor 130 includes multiple vanes 131 and a boss 135.

As shown in FIG. 2, the multiple vanes 131 protrude outward in the radial direction RD from the boss 135 that is located at a center of the vane rotor 130 and are arranged adjacent to each other in the circumferential direction. The vanes 131 are housed respectively in the hydraulic chambers 140 and divide the hydraulic chambers 140 in the circumferential direction into retard chambers 141 and advance chambers 142. Each of the retard chambers 141 is located on one side of the vane 131 in the circumferential direction. Each of the advance chambers 142 is located on the other side of the vane 131 in the circumferential direction. One of the multiple vanes 131 defines a housing hole 132 in the axial direction. The housing hole 132 is in communication with the retard chamber 141 through a retard chamber pin control oil channel 133 defined in the vane 131 and in communication with the advance chamber 142 through an advance chamber pin control oil channel 134. The lock pin 150 is housed in the housing hole 132 such that the lock pin 150 can reciprocate in the axial direction AD in the housing hole 132. The lock pin 150 is configured to restrict the vane rotor 130 from rotating relative to the housing 120 and restrict the vane rotor 130 from coming into contact with the housing 120 in the circumferential direction when the hydraulic pressure is insufficient. The lock pin 150 is biased in the axial direction AD toward the fitting recessed portion 128 formed in the sprocket 121 by a spring 151.

The boss 135 has a tubular shape and is fixed to the end portion 321 of the camshaft 320. Therefore, the vane rotor 130 having the boss 135 is fixed to the end portion 321 of the camshaft 320 and rotates integrally together with the camshaft 320. The boss 135 defines a through hole 136 passing through the boss 135 in the axial direction AD at a center of the boss 135. The hydraulic oil control valve 10 is arranged in the through hole 136. The boss 135 defines multiple retard channels 137 and multiple advance channels 138. The retard channels 137 and the advance channels 138 pass through the boss 135 in the radial direction RD. The retard channels 137 and the advance channels 138 are arranged adjacent to each other in the axial direction AD. The retard channels 137 fluidly connect between the retard chambers 141 and retard ports 27 of the hydraulic oil control valve 10 which will be described later. The advance channels 138 fluidly connect between the advance chambers 142 and advance ports 28 of the hydraulic oil control valve 10 which will be described later. In the through hole 136, spaces between the retard channels 137 and the advance channels 138 are sealed by an outer sleeve 30 of the hydraulic oil control valve 10 which will be described later.

In the present embodiment, the housing 120 and the vane rotor 130 are made of an aluminum alloy, but a material of the housing 120 and the vane rotor 130 is not limited to the aluminum alloy and may be any metal material such as iron or stainless steel, a resin material, or the like.

As shown in FIG. 1, the hydraulic oil control valve 10 is used for the valve timing adjustment device 100 and coaxially arranged with the rotational axis AX of the valve timing adjustment device 100. The hydraulic oil control valve 10 is configured to control a flow of the hydraulic oil supplied from the hydraulic oil supply source 350. The operation of the hydraulic oil control valve 10 is controlled by an ECU (not shown) that controls an overall operation of the internal combustion engine 300. The hydraulic oil control valve 10 is driven by a solenoid 160 arranged on a side of the hydraulic oil control valve 10 opposite to the camshaft 320 in the axial direction AD. The solenoid 160 has an electromagnetic portion 162 and a shaft 164. The solenoid 160 moves the shaft 164 in the axial direction AD when the electromagnetic portion 162 is energized by instructions from the ECU. Thereby, the shaft 164 presses a spool 50 of the hydraulic oil control valve 10, which will be described later, toward the camshaft 320 against a biasing force of a spring 60. As will be described later, the spool 50 slides in the axial direction AD by being pressed, so that oil channels can be switched between oil channels in communication with the retard chambers 141 and oil channels in communication with the advance chambers 142. In the following description, a side of the hydraulic oil control valve 10 opposite to the solenoid 160 in the axial direction AD is referred to as a side closer to the camshaft 320 for descriptive purpose.

Figure 3:
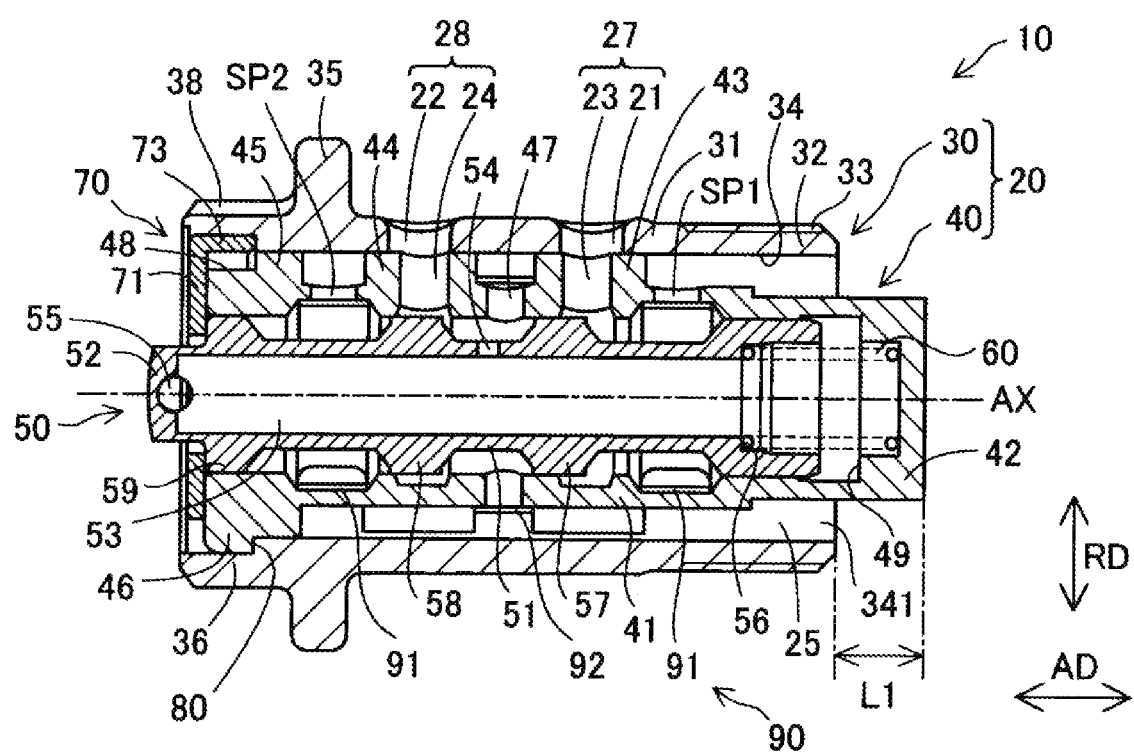
FIG. 3 is a cross-sectional view showing a detailed configuration of the hydraulic oil control valve.
Figure 4:
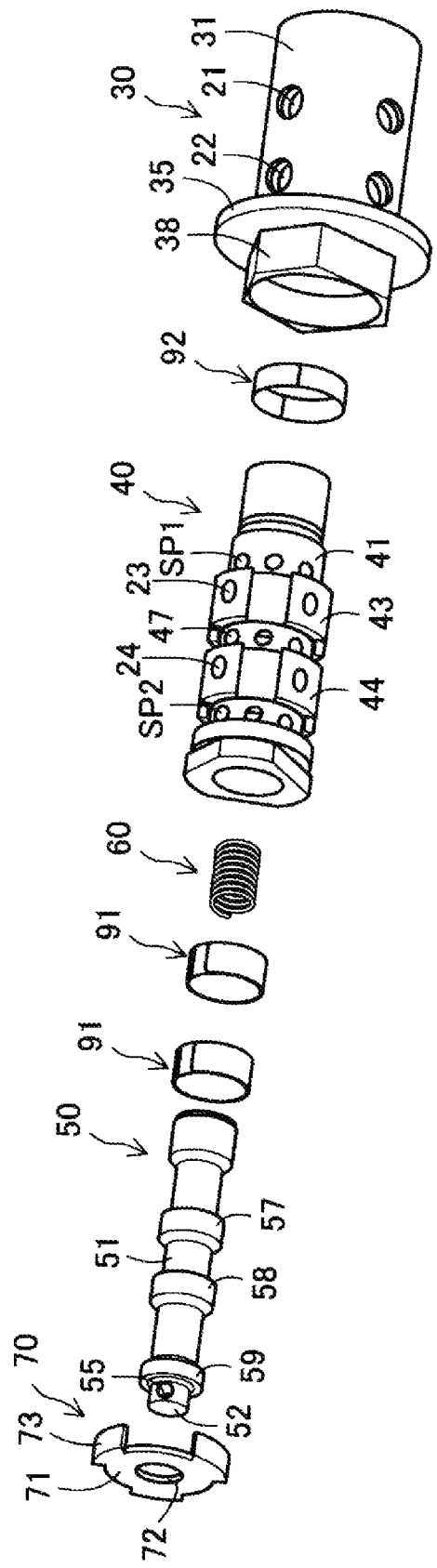
FIG. 4 is an exploded perspective view showing a detailed configuration of the hydraulic oil control valve.

As shown in FIGS. 3 and 4, the hydraulic oil control valve 10 includes a sleeve 20, the spool 50, the spring 60, a fixing member 70, and a check valve 90. FIG. 3 is a cross-sectional view taken along the rotational axis AX.

The sleeve 20 includes the outer sleeve 30 and an inner sleeve 40. Each of the outer sleeve 30 and the inner sleeve 40 substantially has a tubular shape. The sleeve 20 has a schematic configuration in which the inner sleeve 40 is inserted into an axial hole 34 defined in the outer sleeve 30.

The outer sleeve 30 forms an outer contour of the hydraulic oil control valve 10 and is disposed outside of the inner sleeve 40 in the radial direction RD. The outer sleeve 30 has the main body 31, a fixing portion 32, a protrusion 35, a large diameter portion 36, a movement restricting portion 80, and a tool engaging portion 38. The main body 31 and the fixing portion 32 define the axial hole 34 extending in the axial direction AD. The axial hole 34 passes through the outer sleeve 30 in the axial direction AD. In the following description, an end portion of the axial hole 34 in the axial direction AD closer to the camshaft 320 is also referred to as "an axial hole end portion 341".

The main body 31 has a substantially tubular appearance and is arranged in the through hole 136 of the vane rotor 130 as shown in FIG. 1. As shown in FIG. 4, the main body 31 defines multiple outer retard ports 21 and multiple outer advance ports 22. The multiple outer retard ports 21 are arranged adjacent to each other in the circumferential direction and pass through the main body 31 between an outer circumferential surface of the main body 31 and the axial hole 34. The multiple outer advance ports 22 are defined between the outer retard ports 21 and the solenoid 160 in the axial direction AD. The multiple outer advance ports 22 are arranged adjacent to each other in the circumferential direction and pass through the main body 31 between the outer circumferential surface of the main body 31 and the axial hole 34.

The fixing portion 32 has a tubular appearance and connected to the main body 31 in the axial direction AD. The fixing portion 32 forms an end portion of the outer sleeve 30 away from the solenoid 160. The fixing portion 32 has a diameter substantially the same as that of the main body 31 and is inserted into the shaft fixing portion 323 of the camshaft 320 as shown in FIG. 1. The fixing portion 32 has the male thread portion 33. The male thread portion 33 is configured to be screwed with the female thread portion 324 of the shaft fixing portion 323. The male thread portion 33 and the female thread portion 324 are configured to be fastened to each other, so that an axial force in the axial direction AD is applied to the outer sleeve 30 and the outer sleeve 30 is fixed to the end portion 321 of the camshaft 320. With the axial force, it is possible to prevent the hydraulic oil control valve 10 from being displaced from the end portion 321 of the camshaft 320 due to an eccentric force of the camshaft 320 pushing the intake valve 330. Thus, it is possible to restrict the hydraulic oil from leaking.

The protrusion 35 protrudes outward from the main body 31 in the radial direction RD. As shown in FIG. 1, the protrusion 35 holds the vane rotor 130 between the protrusion 35 and the end portion 321 of the camshaft 320 in the axial direction AD.

As shown in FIG. 3, the large diameter portion 36 is formed in an end portion of the main body 31 closer to the solenoid 160. The large diameter portion 36 has an inner diameter that is larger than those of other portions of the main body 31. In the large diameter portion 36, a flange portion 46 of the inner sleeve 40, which will be described later, is arranged.

The movement restricting portion 80 is configured as a stepped portion in the radial direction RD on the inner circumferential surface of the outer sleeve 30, which is formed by the large diameter portion 36. The movement restricting portion 80 holds the flange portion 46 of the inner sleeve 40, which will be described later, between the movement restricting portion 80 and the fixing member 70 in the axial direction AD. As a result, the movement restricting portion 80 restricts the inner sleeve 40 from moving in a direction away from the electromagnetic portion 162 of the solenoid 160 along the axial direction AD.

The tool engaging portion 38 is formed between the protrusion 35 and the solenoid 160 in the axial direction AD.

The tool engaging portion 38 is configured to be engaged with a tool such as a hexagon socket (not shown), and is used for fastening and fixing the hydraulic oil control valve 10 including the outer sleeve 30 to the end portion 321 of the camshaft 320.

The inner sleeve 40 has a tubular portion 41, an inner sleeve end portion 42, multiple retard protruding walls 43, multiple advance protruding walls 44, a sealing wall 45, the flange portion 46, and a stopper 49.

The tubular portion 41 substantially has a tubular shape and is located inside of the outer sleeve 30 in the radial direction RD between the main body 31 and the fixing portion 32. As shown in FIGS. 3 and 4, the tubular portion 41 defines retard supply ports SP1, advance supply ports SP2, and recycling ports 47. The retard supply ports SP1 are defined between the retard protruding walls 43 and the camshaft 320 in the axial direction AD and pass through the tubular portion 41 between an outer circumferential surface and an inner circumferential surface of the tubular portion 41. In the present embodiment, the multiple retard supply ports SP1 are arranged on a half circumference of the tubular portion 41 in the circumferential direction. However, the multiple retard supply ports SP1 may be arranged on an all circumference of the tubular portion 41 or the tubular portion 41 may have a single retard supply port SP1. The advance supply ports SP2 are defined between the advance protruding walls 44 and the solenoid 160 in the axial direction AD and pass through the tubular portion 41 between the outer circumferential surface and the inner circumferential surface of the tubular portion 41. In the present embodiment, the multiple advance supply ports SP2 are arranged on a half circumference of the tubular portion 41 in the circumferential direction. However, the multiple advance supply ports SP1 may be arranged on an all circumference of the tubular portion 41 or the tubular portion 41 may have a single advance supply port SP2. The retard supply ports SP1 and the advance supply ports SP2 are in communication with the shaft hole portion 322 of the camshaft 320 shown in FIG. 1. As shown in FIGS. 3 and 4, the recycling ports 47 are defined between the retard protruding walls 43 and the advance protruding walls 44 in the axial direction AD and pass through the tubular portion 41 between the outer circumferential surface and the inner circumferential surface of the tubular portion 41. The recycling ports 47 are in communication with the retard supply ports SP1 and the advance supply ports SP2. Specifically, the recycling ports 47 are in communication with the retard supply ports SP1 through spaces that are defined between the inner circumferential surface of the main body 31 of the outer sleeve 30 and the outer circumferential surface of the tubular portion 41 of the inner sleeve 40 and that are defined between adjacent ones of the retard protruding walls 43 in the circumferential direction. The recycling ports 47 are in communication with the advance supply ports SP2 through spaces that are defined between the inner circumferential surface of the main body 31 of the outer sleeve 30 and the outer circumferential surface of the tubular portion 41 of the inner sleeve 40 and that are defined between adjacent ones of the advance protruding walls 44 in the circumferential direction. Therefore, the recycling ports 47 serve as a recycling mechanism for returning the hydraulic oil discharged from the retard chambers 141 or the advance chambers 142 to the supply source. In the present embodiment, multiple recycling ports 47 are formed adjacent to each other in the circumferential direction, but the tubular portion 41 may have a single recycling port 47. An operation of the valve timing adjustment device 100 including a switching of the oil channels by sliding the spool 50 will be described later.

As shown in FIG. 3, the inner sleeve end portion 42 is the end portion of the inner sleeve 40 closer to the camshaft 320 in the axial direction AD. The inner sleeve end portion 42 is formed integrally with the tubular portion 41 and closes the opening of the tubular portion 41. The inner sleeve end portion 42 extends beyond the outer sleeve 30 in the axial direction AD toward the camshaft 320, i.e., away from the solenoid 160. FIG. 3 shows a length L1 in which the inner sleeve end portion 42 protrudes from the outer sleeve 30. As shown in FIG. 1, the inner sleeve end portion 42 overlaps with the supply inlet 326 formed in the end portion 321 of the camshaft 320 in the radial direction RD when the outer sleeve 30 is fixed to the end portion 321 of the camshaft 320, i.e., when the hydraulic oil control valve 10 is used. As shown in FIG. 3, one end of the spring 60 is in contact with the inner sleeve end portion 42.

As shown in FIG. 4, the multiple retard protruding walls 43 protrude outward in the radial direction RD from the tubular portion 41 and are arranged adjacent to each other in the circumferential direction. The retard protruding walls 43 define spaces therebetween in the circumferential direction. The spaces are in communication with the shaft hole portion 322 of the camshaft 320 shown in FIG. 1 and the hydraulic oil supplied from the hydraulic oil supply source 350 flows through the spaces. As shown in FIGS. 3 and 4, the retard protruding walls 43 respectively define inner retard ports 23. Each of the inner retard ports 23 passes through the retard protruding wall 43 between an outer circumferential surface and an inner circumferential surface of the retard protruding walls 43. As shown in FIG. 3, the inner retard ports 23 are respectively in communication with the outer retard ports 21 defined in the outer sleeve 30. Each of the inner retard ports 23 has an axis that is offset from an axis of the outer retard port 21 in the axial direction AD.

As shown in FIG. 4, the multiple advance protruding walls 44 are disposed between the retard protruding walls 43 and the solenoid 160 in the axial direction AD. The multiple advance protruding walls 44 protrude outward in the radial direction RD from the tubular portion 41 and are arranged adjacent to each other in the circumferential direction. The advance protruding walls 44 define spaces therebetween in the circumferential direction. The spaces are in communication with the shaft hole portion 322 shown in FIG. 1 and the hydraulic oil supplied from the hydraulic oil supply source 350 flows through the spaces. As shown in FIGS. 3 and 4, the advance protruding walls 44 respectively define inner advance ports 24. Each of the inner advance ports 24 passes through the advance protruding wall 44 between an outer circumferential surface and an inner circumferential surface of the advance protruding wall 44. As shown in FIG. 3, the inner advance ports 24 are respectively in communication with the outer advance ports 22 defined in the outer sleeve 30. Each of the inner advance ports 24 has an axis that is offset from an axis of the outer advance port 22 in the axial direction AD.

The sealing wall 45 protrudes outward in the radial direction RD from an entire circumference of the tubular portion 41. The sealing wall 45 is disposed between the advance supply ports SP2 and the solenoid 160 in the axial direction AD. The sealing wall 45 seals a space between the inner circumferential surface of the main body 31 of the outer sleeve 30 and the outer circumferential surface of the tubular portion 41 of the inner sleeve 40, thereby restricting the hydraulic oil flowing through a hydraulic oil supply passage 25, which will be described later, from leaking toward the solenoid 160. The sealing wall 45 has an outer diameter that is substantially the same as that of the retard protruding walls 43 and that of the advance protruding walls 44.

The flange portion 46 protrudes outward in the radial direction RD from an entire circumference of the tubular portion 41 at an end portion of the inner sleeve 40 closer to the solenoid 160. The flange portion 46 is arranged in the large diameter portion 36 of the outer sleeve 30. As shown in FIG. 4, the flange portion 46 includes multiple fitting portions 48. The multiple fitting portions 48 are arranged in an outer edge of the flange portion 46 adjacent to each other in the circumferential direction. In the present embodiment, the fitting portions 48 are formed by cutting off the outer edge of the flange portion 46 straight. However, the fitting portions 48 may be formed by cutting off the outer edge into a curved shape. Fitting protrusions 73 of the fixing member 70, which will be described later, are fit to the fitting portions 48.

As shown in FIG. 3, the stopper 49 is formed at the end portion of the inner sleeve 40 closer to the camshaft 320 in the axial direction AD. The stopper 49 has an inner diameter smaller than those of other portions of the tubular portion 41 such that the end portion of the spool 50 closer to the camshaft 320 can come into contact with the stopper 49. The stopper 49 defines a sliding limit position of the spool 50 in a direction away from the electromagnetic portion 162 of the solenoid 160.

The axial hole 34 defined in the outer sleeve 30 and the inner sleeve 40 define a space therebetween. The space serves as the hydraulic oil supply passage 25 when the outer sleeve 30 is fixed to the end portion 321 of the camshaft 320, i.e., when the hydraulic oil control valve 10 is used. The hydraulic oil supply passage 25 is in communication with the shaft hole portion 322 of the camshaft 320 shown in FIG. 1. The hydraulic oil is supplied from the hydraulic oil supply source 350 into the supply inlet 326 and flows into the hydraulic oil supply passage 25 from the axial hole end portion 341 through the shaft hole portion 322. Then, the hydraulic oil is guided to the retard supply ports SP1 and the advance supply ports SP2. As shown in FIG. 3, the outer retard ports 21 and the inner retard ports 23 form retard ports 27 that are in communication with the retard chambers 141 through the retard channels 137 shown in FIG. 2. As shown in FIG. 3, the outer advance ports 22 and the inner advance ports 24 form advance ports 28 that are in communication with the advance chambers 142 through the advance channels 138 shown in FIG. 2.

As shown in FIG. 3, at least a part in the axial direction AD of a clearance between the outer sleeve 30 and the inner sleeve 40 is sealed to restrict a leakage of the hydraulic oil. More specifically, the retard protruding walls 43 seal a clearance between the retard ports 27 and the retard supply ports SP1 and a clearance between the retard ports 27 and the recycling ports 47. The advance protruding walls 44 seal a clearance between the advance ports 28 and the advance supply ports SP2 and a clearance between the advance ports 28 and the recycling ports 47. Further, the sealing wall 45 seals a clearance between the hydraulic oil passage 25 and an outside of the hydraulic oil control valve 10.

The spool 50 is arranged inside of the inner sleeve 40 in the radial direction RD. The spool 50 has an end portion in contact with the solenoid 160 and is driven and moved in the axial direction AD by the solenoid 160.

The spool 50 has a spool tubular portion 51, a spool bottom portion 52, and a spring receiving portion 56. Further, the spool 50 defines therein an axial hole extending along the axial direction AD. The axial hole defines a part of a drain passage 53 which will be described later. Further, the spool 50 defines a drain inlet 54 and a drain outlet 55 that are in communication with the axial hole.

Figure 5:
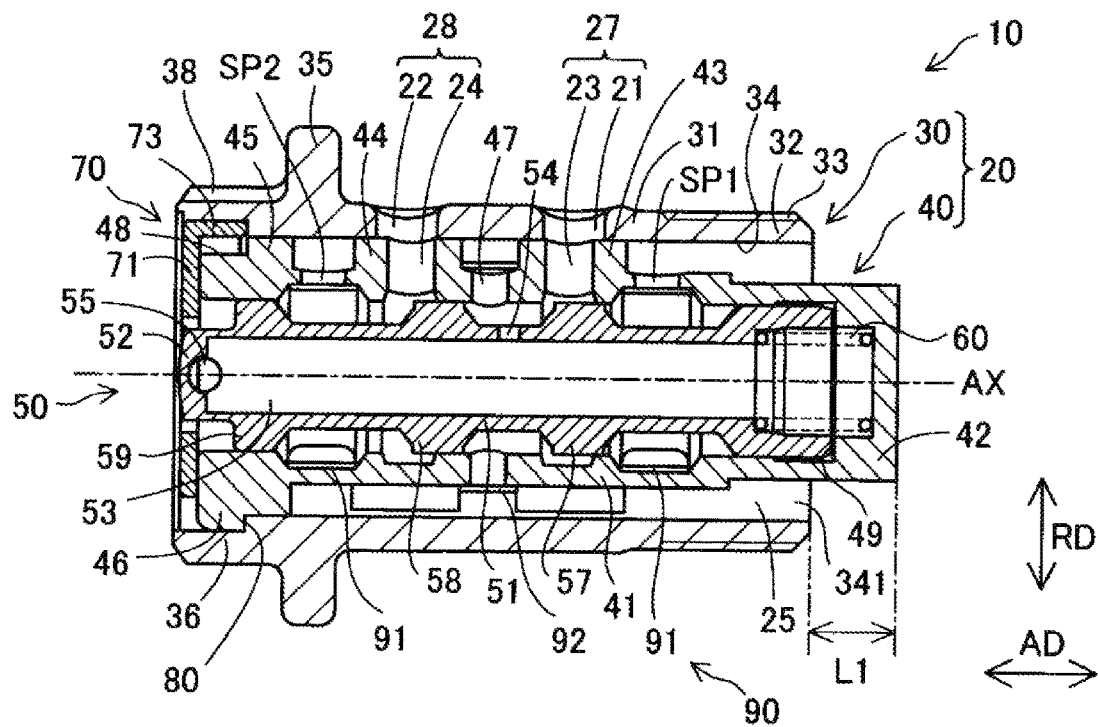
FIG. 5 is a cross-sectional view showing a state where a spool is in contact with a stopper.

As shown in FIGS. 3 and 4, the spool tubular portion 51 substantially has a tubular shape. The spool tubular portion 51 has a retard sealing portion 57, an advance sealing portion 58, and a stopper 59 on an outer circumferential surface of the spool tubular portion 51. The retard sealing portion 57, the advance sealing portion 58, and the stopper 59 are arranged in this order from the end portion of the spool 50 closer to the camshaft 320 in the axial direction AD. Each of the retard sealing portion 57, the advance sealing portion 58, and the stopper 59 protrudes outward in the radial direction RD entirely in the circumferential direction. As shown in FIG. 3, the retard sealing portion 57 blocks a communication between the recycling ports 47 and the retard ports 27 when the spool 50 is located at the closest position to the electromagnetic portion 162 of the solenoid 160. As shown in FIG. 5, the retard sealing portion 57 blocks a communication between the retard supply ports SP1 and the retard ports 27 when the spool 50 is located at the farthest position from the electromagnetic portion 162. As shown in FIG. 3, the advance sealing portion 58 blocks a communication between the advance supply ports SP2 and the advance ports 28 when the spool 50 is located at the closest position to the electromagnetic portion 162. As shown in FIG. 5, the advance sealing portion 58 blocks a communication between the recycling ports 47 and the advance ports 28 when the spool 50 is located at the farthest position from the electromagnetic portion 162. As shown in FIG. 3, the stopper 59 defines the sliding limit of the spool 50 toward the electromagnetic portion 162 of the solenoid 160 by coming into contact with the fixing member 70.

The spool bottom portion 52 is integrally formed with the spool tubular portion 51 and closes an end portion of the spool tubular portion 51 facing the solenoid 160. The spool bottom portion 52 can protrude from the sleeve 20 toward the solenoid 160 in the axial direction AD. The shaft 164 of the solenoid 160 shown in FIG. 1 is in contact with the spool bottom portion 52. The spool bottom portion 52 serves as a proximal end portion of the spool 50.

As shown in FIG. 3, the spring receiving portion 56 is formed at an end portion of the spool tubular portion 51 closer to the camshaft 320 and has an inner diameter that is larger than those of other portions of the spool tubular portion 51. The other end of the spring 60 is in contact with the spring receiving portion 56.

A space surrounded by the spool tubular portion 51, the spool bottom portion 52, the tubular portion 41 of the inner sleeve 40, and the inner sleeve end portion 42 serves as the drain passage 53. Therefore, at least a part of the drain passage 53 is formed inside the spool 50. The hydraulic oil discharged from the retard chambers 141 and the advance chambers 142 flows through the drain passage 53.

The drain inlet 54 is defined in the spool tubular portion 51 between the retard sealing portion 57 and the advance sealing portion 58 in the axial direction AD. The drain inlet 54 passes through the spool tubular portion 51 between the outer circumferential surface and the inner circumferential surface of the spool tubular portion 51. The drain inlet 54 guides the hydraulic oil discharged from the retard chambers 141 and the advance chambers 142 to the drain passage 53. Further, the drain inlet 54 is in communication with the supply ports SP1 and SP2 through the recycling ports 47.

The spool bottom portion 52, which is an end of the spool 50, defines the drain outlet 55 opening outward in the radial direction RD. The hydraulic oil in the drain passage 53 flows out of the hydraulic oil control valve 10 through the drain outlet 55. As shown in FIG. 1, the hydraulic oil discharged through the drain outlet 55 is collected in the oil pan 352.

In the present embodiment, each of the outer sleeve 30 and the spool 50 is made of iron and the inner sleeve 40 is made of aluminum. Materials of the outer sleeve 30, the spool 50, and the inner sleeve 40 are not limited to these materials, and may be any metal material, resin material, or the like. Further, in the present embodiment, a dimension of the outer sleeve 30 in the axial direction AD is smaller than a dimension of the inner sleeve 40 in the axial direction AD.

The spring 60 is composed of a compression coil spring and has one end in contact with the inner sleeve end portion 42 of the inner sleeve 40 and the other end in contact with the spring receiving portion 56 of the spool 50. The spring 60 biases the spool 50 toward the solenoid 160 in the axial direction AD.

The fixing member 70 is fixed to the end portion of the outer sleeve 30 facing the solenoid 160. As shown in FIG. 4, the fixing member 70 includes a flat plate portion 71 and multiple fitting protrusions 73.

The flat plate portion 71 has a flat plate shape extending in the radial direction RD. Extending direction of the flat plate portion 71 is not limited to the radial direction RD and may be a direction intersecting the axial direction AD. The flat plate portion 71 defines an opening 72 at a center of the flat plate portion 71. As shown in FIG. 3, the spool bottom portion 52, which is one end portion of the spool 50, is inserted into the opening 72.

As shown in FIG. 4, the multiple fitting protrusions 73 protrude from the flat plate portion 71 in the axial direction AD and are arranged side by side in the circumferential direction. Protruding direction of the fitting protrusions 73 is not limited to the axial direction AD and may be any direction intersecting the radial direction RD. The fitting protrusions 73 fit to the fitting portions 48 of the inner sleeve 40 respectively.

As shown in FIG. 3, the spool 50 is inserted into the inner sleeve 40 and the fixing member 70 is assembled such that the fitting protrusions 73 fit to the fitting portions 48. After that, the fixing member 70 is deformed to be fixed to the outer sleeve 30. An outer edge portion of the end surface of the fixing member 70 facing the solenoid 160 serves as deformed portions 74 that are deformed to be fixed to the outer sleeve 30.

The fixing member 70 is fixed to the outer sleeve 30 while the fitting protrusions 73 fit to the fitting portions 48. Thus, the inner sleeve 40 is restricted from rotating in the circumferential direction relative to the outer sleeve 30. Further, the fixing member 70 is fixed to the outer sleeve 30, so that the inner sleeve 40 and the spool 50 are restricted from coming off from the outer sleeve 30 in the axial direction AD toward the solenoid 160.

The check valve 90 suppresses a backflow of the hydraulic oil. The check valve 90 includes two supply check valves 91 and a recycling check valve 92. As shown in FIG. 4, each of the supply check valves 91, and the recycling check valve 92 are formed by winding a band-shaped thin plate into an annular shape, so that each of the supply check valves 91 and the recycling check valve 92 can be elastically deformed in the radial direction RD. As shown in FIG. 3, each of the supply check valves 91 is arranged in contact with the inner circumferential surface of the tubular portion 41 at a position corresponding to the retard supply port SP1 or the advance supply port SP2. When each of the supply check valves 91 receives pressure of the hydraulic oil from an outside of the each of the supply check valves 91 in the radial direction RD, an overlapping area of the band-shaped thin plate increases and the each of the supply check valves 91 shrinks in the radial direction RD. The recycling check valve 92 is arranged in contact with the outer circumferential surface of the tubular portion 41 at a position corresponding to the recycling port 47. When the recycling check valve 92 receives the pressure of the hydraulic oil from an inside of the recycling check valve 92 in the radial direction RD, an overlapping area of the band-shaped thin plate decreases and expands in the radial direction RD.

In the present embodiment, the crankshaft 310 is a subordinate concept of the drive shaft in the present disclosure, the camshaft 320 is a subordinate concept of the driven shaft in the present disclosure, and the intake valve 330 is a subordinate concept of the valve in the present disclosure. Further, the solenoid 160 corresponds to a subordinate concept of the actuator in the present disclosure.

A-2. Operation of Valve Timing Adjustment Device

As shown in FIG. 1, the hydraulic oil supplied from the hydraulic oil supply source 350 to the supply inlet 326 flows into the hydraulic oil supply passage 25 from the axial hole end portion 341 through the shaft hole portion 322. When the solenoid 160 is not energized and the spool 50 is located at the closest position to the electromagnetic portion 162 of the solenoid 160 as shown in FIG. 3, the retard ports 27 are in communication with the retard supply ports SP1. As a result, the hydraulic oil in the hydraulic oil supply passage 25 is supplied into the retard chambers 141, the vane rotor 130 rotates in the retard direction relative to the housing 120, and a relative rotation phase of the camshaft 320 with respect to the crankshaft 310 is shifted in the retard direction. Further, in this state, the advance ports 28 are not in communication with the advance supply ports SP2 but in communication with the recycling ports 47. As a result, the hydraulic oil flowing out of the advance chambers 142 is returned to the retard supply ports SP1 through the recycling ports 47 and recirculated. Further, a part of the hydraulic oil flowing out of the advance chambers 142 flows into the drain passage 53 through the drain inlet 54, and is returned to the oil pan 352 through the drain outlet 55.

When the solenoid 160 is energized and the spool 50 is located at the farthest position from the electromagnetic portion 162 of the solenoid 160 as shown in FIG. 5, i.e., when the spool 50 is in contact with the stopper 49, the advance ports 28 are in communication with the advance supply ports SP2. As a result, the hydraulic oil in the hydraulic oil supply passage 25 is supplied into the advance chambers 142, the vane rotor 130 rotates in the advance direction relative to the housing 120, and the relative rotation phase of the camshaft 320 with respect to the crankshaft 310 is shifted in the advance direction. Further, in this state, the retard ports 27 are not in communication with the retard supply ports SP1 but in communication with the recycling ports 47. As a result, the hydraulic oil flowing out of the retard chambers 141 is returned to the advance supply ports SP2 through the recycling ports 47 and recirculated. Further, a part of the hydraulic oil flowing out of the retard chambers 141 flows into the drain passage 53 through the drain inlet 54, and is returned to the oil pan 352 through the drain outlet 55.

Figure 6:
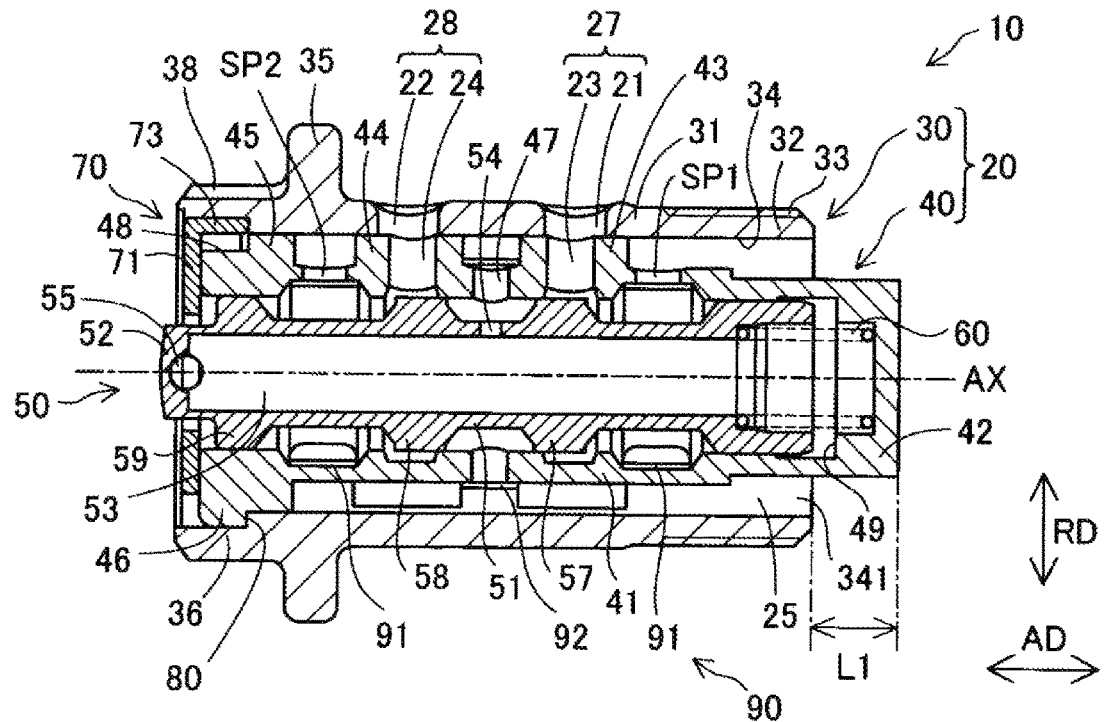
FIG. 6 is a cross-sectional view showing a state in which the spool is located substantially at a center in a sliding area.

Further, as shown in FIG. 6, when the solenoid 160 is energized and the spool 50 is located substantially in the center of the sliding area, the retard ports 27 are in communication with the retard supply ports SP1 and the advance ports 28 are in communication with the advance supply ports SP2. As a result, the hydraulic oil in the hydraulic oil supply passage 25 is supplied to both the retard chambers 141 and the advance chambers 142, the vane rotor 130 is restricted from rotating relative to the housing 120, and the relative rotation phase of the camshaft 320 with respect to the crankshaft 310 is maintained.

The hydraulic oil supplied to the retard chambers 141 or the advance chambers 142 flows into the housing hole 132 through the retard chamber pin control oil channel 133 or the advance chamber pin control oil channel 134. Therefore, when sufficient hydraulic pressure is applied to the retard chambers 141 or the advance chambers 142, the lock pin 150 comes off from the fitting recessed portion 128 against the biasing force of the spring 151 by the hydraulic oil flowing into the housing hole 132 and the vane rotor 130 is allowed to rotate relative to the housing 120.

When the relative rotation phase of the camshaft 320 is advanced from the target phase, the valve timing adjustment device 100 sets an energizing amount to the solenoid 160 to a relatively small value and the vane rotor 130 is rotated in the retard direction relative to the housing 120. As a result, the relative rotation phase of the camshaft 320 with respect to the crankshaft 310 is shifted in the retard direction and the valve timing is retarded. Further, when the relative rotation phase of the camshaft 320 is retarded from the target value, the valve timing adjustment device 100 sets the energization amount to the solenoid 160 to a relatively large value and the vane rotor 130 is rotated in the advance direction relative to the housing 120. As a result, the relative rotation phase of the camshaft 320 with respect to the crankshaft 310 is shifted in the advance direction and the valve timing is advanced. Further, when the relative rotation phase of the camshaft 320 matches the target phase, the valve timing adjustment device 100 sets the energization amount to the solenoid 160 to a medium value and restricts the vane rotor 130 from rotating relative to the housing 120. As a result, the relative rotation phase of the camshaft 320 with respect to the crankshaft 310 is maintained and the valve timing is maintained.

According to the hydraulic oil control valve 10 of the present embodiment described above, the inner sleeve end portion 42 protrudes in the axial direction AD from the outer sleeve 30 toward the camshaft 320, i.e., away from the solenoid 160. Thus, an increase in the dimension of the outer sleeve 30 in the axial direction AD can be suppressed compared to a configuration in which the inner sleeve end portion 42 overlaps with the outer sleeve 30 in the radial direction RD. Therefore, it is possible to suppress an increase in a dimension in the axial direction AD of the shaft hole portion 322 that is defined in the end portion 321 of the camshaft 320, i.e., a dimension in the axial direction of the shaft hole portion 322 forming the shaft fixing portion 323 to fix the hydraulic oil control valve 10. Therefore, it is possible to suppress an increase in the length of the camshaft 320 and it is possible to suppress an increase in the dimension in the axial direction AD of the internal combustion engine 300 including the solenoid 160 and the camshaft 320. Further, since it is possible to suppress an increase in the size of the outer sleeve 30 in the axial direction AD, it is possible to improve the mountability of the hydraulic oil control valve 10 and the valve timing adjustment device 100.

Further, since an increase in the dimension of the shaft hole portion 322 in the axial direction AD can be suppressed by reducing the dimension of the outer sleeve, it is unnecessary to change designs of the inner sleeve 40, the spool 50, and the outer sleeve 30 other then the fixing portion 32. Thus, it is possible to suppress an increase in cost required for suppressing an increase in the size of the shaft hole portion 322 in the axial direction AD.

Further, the space between the axial hole 34 defined in the outer sleeve 30 and the inner sleeve 40 serves as the hydraulic oil supply passage 25 and the hydraulic oil flows into the space through the axial hole end portion 341. Thus, the supply inlet 326 in communication with the shaft hole portion 322 in the radial direction RD can be defined in a portion of the end portion 321 of the camshaft 320 between the outer sleeve 30 and the camshaft 320 in the axial direction AD. Therefore, it is possible to restrict the configuration of the supply inlet 326 from being complicated and to restrict the configuration of the end portion 321 of the camshaft 320 from being complicated. Further, it is possible to suppress a decrease in the degree of freedom in design for mounting the hydraulic oil control valve 10 and the valve timing adjustment device 100.

Further, the dimension of the outer sleeve 30 in the axial direction AD is smaller than the dimension of the inner sleeve 40 in the axial direction AD. Here, the outer sleeve 30 holds the vane rotor 130 between the protrusion 35 and the end portion 321 of the camshaft 320 in the axial direction AD and is fastened to the end portion 321 of the camshaft 320, so that an axial force in the axial direction is applied to the outer sleeve 30. Thus, the outer sleeve 30 requires a higher strength than the inner sleeve 40 does and processing the outer sleeve 30 is more difficult than processing the inner sleeve 40. However, according to the valve timing adjustment device 100 of the present embodiment, the dimension of the outer sleeve 30 in the axial direction AD is smaller than the dimension of the inner sleeve 40, so that it is possible to suppress an increase in the cost required for manufacturing the outer sleeve 30.

Further, since the inner sleeve end portion 42 overlaps with the supply inlet 326 in the radial direction RD, it is possible to further suppress an increase in a dimension of the shaft hole portion 322 in the axial direction AD and to further suppress an increase in a dimension of the internal combustion engine 300 in the axial direction AD.

Further, since the fixing portion 32 is formed at the end portion of the outer sleeve 30 closer to the camshaft 320 in the axial direction AD, it is possible to suppress an increase in a dimension in the axial direction AD of the shaft hole portion 322 defined in the end portion 321 of the camshaft 320 compared to a configuration in which the fixing portion 32 is formed in a portion of the outer sleeve 30 between the end portion of the outer sleeve 30 closer to the camshaft 320 and the solenoid 160.

Further, since the sleeve 20 has a double-structure composed of the outer sleeve 30 and the inner sleeve 40, a complicated configuration such as a structure for fluidly connecting between the ports SP1, SP2, 23, 24, and 47, and between the retard supply port SP1 and the advance supply port SP2 can be easily formed on the inner sleeve 40. Therefore, the workability of the sleeve 20 can be improved and the manufacturing process of the sleeve 20 can be restricted from becoming complicated. Further, since the workability can be improved, the degree of freedom in designing each port SP1, SP2, 27, 28, 47, and the like can be improved, and the mountability of the hydraulic oil control valve 10 and the valve timing adjustment device 100 can be improved.

B. Comparative Example

Figure 7:
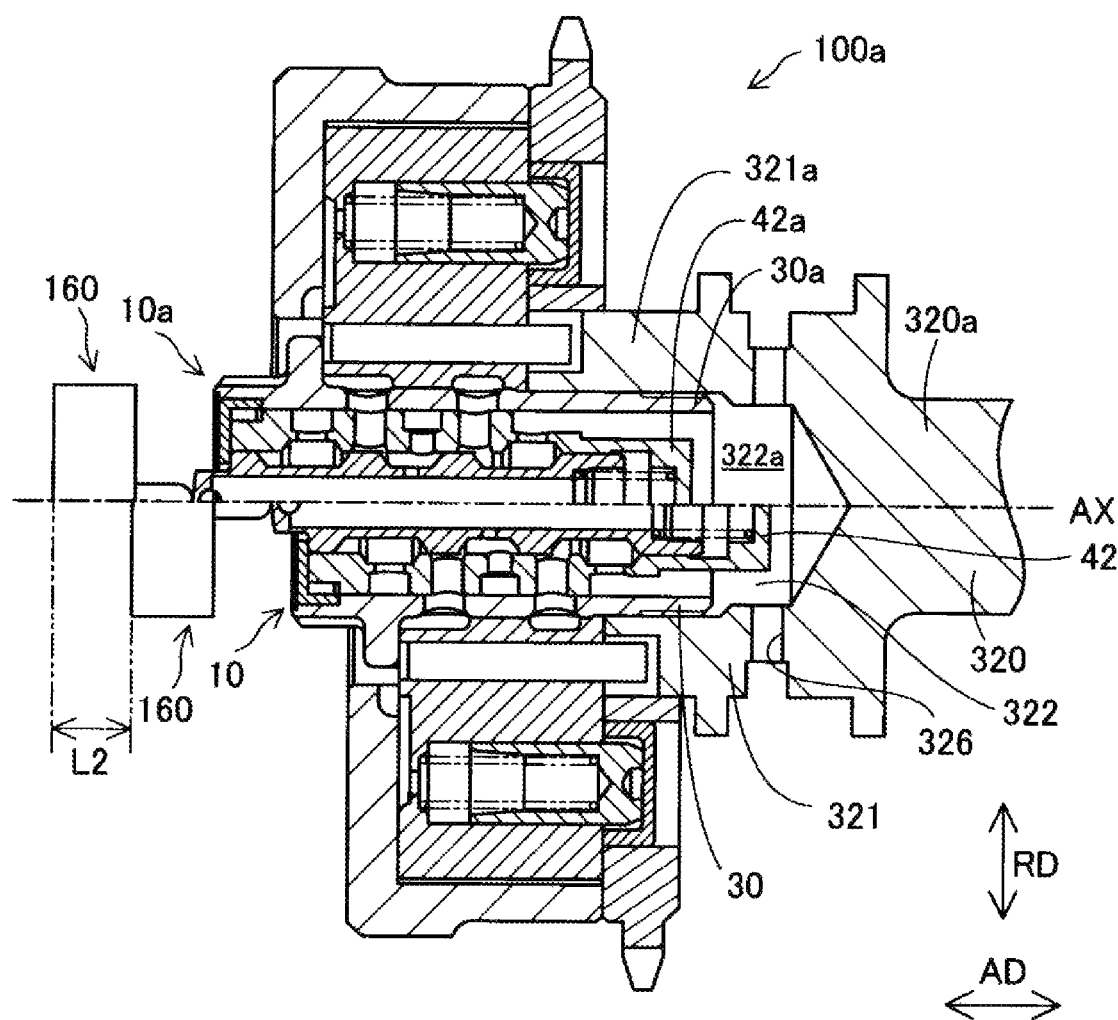
FIG. 7 is an explanatory diagram illustrating a dimensional difference between the hydraulic oil control valve of the present embodiment and a hydraulic oil control valve of a comparative example.

In FIG. 7, a valve timing adjustment device 100a including a hydraulic oil control valve 10a of a comparative example is shown in an upper portion of the rotational axis AX and the valve timing adjustment device 100 including the hydraulic oil control valve 10 of the present embodiment is shown in a lower portion of the rotational axis AX in an inverted manner.

In the hydraulic oil control valve 10a of the comparative example, an inner sleeve end portion 42a does not protrude from an outer sleeve 30a toward a camshaft 320a in the axial direction AD. In other words, the inner sleeve end portion 42a overlaps with the outer sleeve 30a in the radial direction RD. Thus, the size of the outer sleeve 30a in the axial direction AD is increased. Along with this, the dimension in the axial direction AD of a shaft hole portion 322a formed at an end portion 321a is increased.

On the other hand, in the hydraulic oil control valve 10 of the present embodiment, the inner sleeve end portion 42 protrudes from the outer sleeve 30 toward the camshaft 320 in the axial direction AD. Thus, the dimension of the outer sleeve 30 in the axial direction AD can be shortened. Therefore, it is possible to restrict the dimension in the axial direction AD of the shaft hole portion 322 from becoming large, and a dimension in the axial direction AD of the internal combustion engine including the solenoid 160 and the camshaft 320 can be shortened compared to the comparative example. FIG. 7 illustrates a length L2 that can be shortened as compared with the comparative example.

C. Other Embodiments (1) The configuration of the hydraulic oil control valve 10 in the above embodiment is an example and may be variously altered. For example, the present disclosure is not limited to the configuration in which the hydraulic oil flows into the hydraulic oil control valve through the axial hole end portion 341 of the outer sleeve 30. The outer sleeve 30 may define a through hole passing through the outer sleeve 30 in the radial direction RD between the outer circumferential surface of the outer sleeve 30 and the axial hole 34 and the hydraulic oil may flow into the space between the axial hole 34 and the inner sleeve 40 in the radial direction RD through the through hole. Further, for example, the dimension of the outer sleeve 30 in the axial direction AD may be equal to or larger than the dimension of the inner sleeve 40 in the axial direction AD such that an end portion of the outer sleeve 30 closer to the solenoid 160 protrudes in the axial direction AD toward the solenoid 160 over the end portion of the inner sleeve 40 closer to the solenoid 160. Further, for example, the inner sleeve end portion 42 may not overlap with the supply inlet 326 defined in the end portion 321 of the camshaft 320 in the radial direction RD and may be located between the supply inlet 326 and the solenoid 160 in the axial direction AD. Further, for example, the recycling mechanism with the recycling ports 47 may be omitted. Further, for example, the inner space of the spool 50 may be configured as the hydraulic oil supply passage 25. Further, fixing method to the end portion 321 of the camshaft 320 is not limited to fastening between the male thread portion 33 and the female thread portion 324. The fixing to the end portion 321 of the camshaft 320 may be realized by any method such as welding. Further, the present disclosure is not limited to the solenoid 160 and any actuators such as an electric motor and an air cylinder may drive the hydraulic control valve. Such a configuration also achieves the same effects as those of the embodiment described above.

(2) In the above embodiment, the valve timing adjustment device 100 adjusts the valve timing of the intake valve 330 that is opened and closed by the camshaft 320, but the valve timing adjustment device 100 may adjust the valve timing of the exhaust valve 340. Further, the valve timing adjustment device 100 may be fixed to the end portion 321 of the camshaft 320 as a driven shaft to which a driving force is transmitted from the crankshaft 310 as the driving shaft through an intermediate shaft, or may be fixed to one of the end of the drive shaft and the end of the driven shaft of the camshaft having the double structure. According to such a configuration, it is possible to suppress an increase in the dimension in the axial direction AD of the shaft hole portion defined in the end portion of one of the drive shaft and the driven shaft.

The present disclosure should not be limited to the embodiments described above, and various other embodiments may be implemented without departing from the scope of the present disclosure. For example, the technical features in the embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they may be omitted as appropriate.

What is claimed is:

1. A hydraulic oil control valve for a valve timing adjustment device, the valve timing adjustment device being configured to adjust valve timing of a valve and fixed to an end portion of one shaft that is a drive shaft or a driven shaft, the driven shaft being configured to selectively open and close the valve with a driving force transmitted from the drive shaft, the hydraulic oil control valve being coaxially disposed with a rotational axis of the valve timing adjustment device and configured to control a flow of a hydraulic oil supplied from a hydraulic oil supply source, the hydraulic oil control valve comprising:
   a tubular sleeve;
   a spool that has an end portion in contact with an actuator and that is slidably moved by the actuator in an axial direction within the sleeve in a radial direction, wherein the sleeve includes:
      an inner sleeve disposed outside of the spool in the radial direction; and
      an outer sleeve defining therein an axial hole extending in the axial direction, the inner sleeve being inserted into the axial hole,
   the outer sleeve has an outer circumferential surface defining a thread portion engageable with a thread portion of the one shaft,
   the outer sleeve is configured to be fixed to the end portion of the one shaft through engagement between the thread portion of the outer sleeve and the thread portion of the one shaft by an axial force applied to the outer sleeve in the axial direction,
   the inner sleeve has an inner sleeve end portion that is an end portion of the inner sleeve in the axial direction away from the actuator, and
   the inner sleeve end portion extends beyond the outer sleeve away from the actuator in the axial direction.

2. The hydraulic oil control valve according to claim 1, wherein
   a space between the axial hole and the inner sleeve in the radial direction serves as a hydraulic oil supply passage, fluid communication between the hydraulic oil supply passage and the hydraulic oil supply source being established when the outer sleeve is fixed to the end portion of the one shaft, the axial hole has an axial hole end portion that is an end portion of the axial hole in the axial direction away from the actuator, and the hydraulic oil flows into the space through the axial hole end portion.

3. The valve timing adjustment device according to claim 2, wherein the fluid communication between the hydraulic oil supply passage and the hydraulic oil supply source is established outside of an inside of the inner sleeve.

4. The valve timing adjustment device according to claim 2, wherein the axial hole end portion entirely extends in a circumferential direction.

5. The hydraulic oil control valve according to claim 1, wherein the outer sleeve has a dimension in the axial direction that is smaller than that of the inner sleeve.

6. The hydraulic oil control valve according to claim 1, wherein the end portion of the one shaft defines a supply inlet extending in a direction intersecting the axial direction, the hydraulic oil being supplied into the hydraulic oil control valve through the supply inlet, and the inner sleeve end portion overlaps with the supply inlet in the radial direction when the outer sleeve is fixed to the end portion of the one shaft.

7. A valve timing adjustment device comprising the hydraulic oil control valve according to claim 1.

\* \* \* \* \*